(12) United States Patent
Gebhart et al.

(10) Patent No.: US 12,111,201 B2
(45) Date of Patent: Oct. 8, 2024

(54) SENSOR SYSTEM, USE OF A SENSOR SYSTEM, DEVICE, AND METHOD FOR MEASURING A FILLING LEVEL

(71) Applicant: TDK Electronics AG, Munich (DE)

(72) Inventors: Michael Gebhart, Linz (AT); Stefan Sax, Graz (AT); Thomas Koidl, Graz-Puntigam (AT); Michael Pirolt, Graz (AT)

(73) Assignee: TDK Electronics AG, Munich (DE)

( * ) Notice: Subject to any disclaimer, the term of this patent is extended or adjusted under 35 U.S.C. 154(b) by 261 days.

(21) Appl. No.: 17/636,738

(22) PCT Filed: Sep. 7, 2020

(86) PCT No.: PCT/EP2020/074909
§ 371 (c)(1),
(2) Date: Feb. 18, 2022

(87) PCT Pub. No.: WO2021/083571
PCT Pub. Date: May 6, 2021

(65) Prior Publication Data
US 2022/0326064 A1 Oct. 13, 2022

(30) Foreign Application Priority Data
Oct. 29, 2019 (AT) .............................. GM50190 2019

(51) Int. Cl.
*G01F 23/2962* (2022.01)

(52) U.S. Cl.
CPC ............................... *G01F 23/2962* (2013.01)

(58) Field of Classification Search
CPC .................................................. G01F 23/2962
See application file for complete search history.

(56) References Cited

U.S. PATENT DOCUMENTS

| 5,768,939 A | * | 6/1998 | Quayle | G01F 23/2962 73/290 V |
| 5,778,726 A | * | 7/1998 | Muller | G01F 23/2961 367/908 |
| 5,866,815 A | | 2/1999 | Schwald et al. | |
| 2004/0007061 A1 | * | 1/2004 | Forgue | G01F 23/2968 73/290 V |

(Continued)

FOREIGN PATENT DOCUMENTS

| DE | 4311963 A1 | 10/1994 |
| DE | 10305003 A1 | 8/2004 |

(Continued)

OTHER PUBLICATIONS

Blautanken, (https://www.blautanken.de/adblue-1OOO-liter-ibc-container/), AdBlue 1000 liter IBC container, 2019, 3 pages.

*Primary Examiner* — Kristina M Deherrera
*Assistant Examiner* — Jean F Morello
(74) *Attorney, Agent, or Firm* — Slater Matsil, LLP (57) ABSTRACT

In an embodiment a sensor system includes a housing, an electronic circuit and an ultrasonic distance sensor, wherein the electronic circuit and the ultrasonic distance sensor are arranged in the housing, and wherein the sensor system is configured to measure a distance between the sensor system and a surface of a material in a container by an echo propagation time of an ultrasonic burst in air.

23 Claims, 3 Drawing Sheets

(56) References Cited

U.S. PATENT DOCUMENTS

2016/0025545 A1     1/2016   Saltzgiver et al.
2019/0223828 A1*    7/2019   Torp ..................... A61B 8/5207
2022/0291331 A1*    9/2022   Dieterle ................. G01S 13/88

FOREIGN PATENT DOCUMENTS

EP          0438864 A1    7/1991
EP          1850098 A2    10/2007

* cited by examiner

FIG 1  State of the Art

FIG 2  State of the Art

SENSOR SYSTEM, USE OF A SENSOR SYSTEM, DEVICE, AND METHOD FOR MEASURING A FILLING LEVEL

This patent application is a national phase filing under section 371 of PCT/EP2020/074909, filed Sep. 7, 2020, which claims the priority of Austrian patent application GM50190/2019, filed Oct. 29, 2019, each of which is incorporated herein by reference in its entirety.

TECHNICAL FIELD

The present invention relates to a sensor system for measuring a filling level. The present invention further relates to a device for measuring a filling level. The present invention further relates to the use of a sensor system for measuring a filling level. The present invention further relates to a method for measuring a filling level.

BACKGROUND

In industry, especially in the chemical industry, but also in cleaning companies and private households, containers or canisters are used for storing liquids. Certain sizes have become the norm. Such canisters always have the same type of screw lid, especially with regard to the characteristics of the screw thread and the size of the lid, as well as other functions (for example, an option for pressure compensation).

When handling these canisters, the question arises as to the filling level, i.e. how much of the stored liquid is still available in the container, or when new liquid should possibly be ordered and refilled.

Up to now, it has been common practice to unscrew the lid of the canister and dip a rod into the liquid down to the bottom of the canister, pull it out again, and estimate the filling level on the basis of the level of liquid wetting on the rod.

Especially in the case of corrosive or hazardous liquids, this is a very unpleasant job, corrosive gases escape and one has to physically handle the hazardous liquid and may, for example, contaminate oneself with it.

SUMMARY

Embodiments provide a sensor system, a device, a use and a method which solve the above problems.

According to one embodiment, a sensor system is described. The sensor system is adapted for measuring a filling level. In particular, the sensor system is suitable for determining the filling level of a material (preferably a liquid or a bulk material) in a container. The sensor system is adapted to determine the filling level without any contact to the material.

The sensor system has a housing. The housing is adapted to accommodate further components of the sensor system and to protect them against external influences. The sensor system further comprises an electronic circuit. The sensor system further comprises an ultrasonic distance sensor. The electronic circuit and the ultrasonic distance sensor are arranged in the housing. Preferably, at least the electronic circuit is completely enclosed by the housing.

The sensor system is adapted to measure a distance between the sensor system and a surface of the material (i.e. a liquid level or a surface of the bulk material) in the container by means of an echo propagation time of an ultrasonic burst in the air. The container is preferably a standard container, for example a standard canister.

Ultrasonic filling level measurement has the advantage over electrical methods that the ultrasound used is a mechanical-acoustic wave, and that the sensor system can be adapted with regard to fire hazard and explosion protection in such a way that no live parts reach into the area of the material or the air volume above it.

The use of an ultrasonic sensor in the sensor system also has the advantage that it is a low-cost sensor, that the measurement can be carried out with lower frequencies in the electrical signal processing due to the slow speed of sound—compared to light—, and that it is therefore potentially possible to carry out a sufficiently accurate filling level measurement with little operating power. This provides a precise, efficient and cost-effective sensor system and measurement method.

Furthermore, the sensor system enables non-contact and non-invasive filling level measurement. There is no contact whatsoever with the material/liquid, no modifications have to be made to the container and the filling level measurement is furthermore independent of a content and a material of the container. This makes the sensor system an excellent choice for measuring the filling level of hazardous liquids or bulk materials (corrosive, toxic, hot condition).

According to one embodiment, the electronic circuit is adapted and arranged to determine the filling level of the material from a measured distance, taking into account geometric parameters, for example a shape and/or a size and/or a volume of the container.

The electronic circuit has a microcontroller for controlling the measuring process and for evaluating the filling level. The electronic circuit further comprises a battery or a supply unit or an energy harvester for power supply. The electronic circuit can also have house-keeping functions (e.g. monitoring of the supply voltage, temperature, etc.) to better ensure the plausibility of measurements.

According to one embodiment, the ultrasonic distance sensor is adapted to emit at least one ultrasonic burst. A frequency of the ultrasonic burst is in a range B of 20 kHz$<$B$\leq$100 kHz. Preferably, the ultrasonic distance sensor emits a plurality of bursts of an operating frequency of 75 kHz. The ultrasonic distance sensor is adapted to receive an echo generated by the ultrasonic burst on the surface of the material.

According to one embodiment, the sensor system is configured to be received in a lid of the container. The lid is preferably a standard lid, for example a DN-150 lid. Preferably, the sensor system is configured for detachable attachment to the lid of the container.

Preferably, the sensor system, in particular the housing, has a thread. The thread is formed on an outer side of the housing. Preferably, the thread is a G2 thread. The thread is adapted for mechanical connection to the lid of the container. The thread is adapted to engage a corresponding thread of the lid. Preferably, the sensor system is connected to the lid in the manner of a grub screw. This enables a detachable and secure connection between the sensor system and the container.

Consequently, the sensor system is detachable and portable and is thus not bound to any infrastructure (external cable connections). It can be used stationary or mobile.

With only little effort (unscrewing and screwing the housing into the lid), filling levels in several containers can be measured or compared one after the other. This also makes it easier to maintain or calibrate the sensor system.

According to an embodiment, the housing is formed in several parts. In particular, the housing has a middle section, a first end section and a second end section. The middle section has the shape of a cylinder shell. The first end section and the second end section are each disc-shaped. The first end section and the second end section are disposed at opposite openings of the middle section. This provides a robust housing for accommodating the other components of the sensor system.

According to one embodiment, the second end section has an opening. The opening completely penetrates the second end section. The ultrasonic distance sensor is inserted into the opening in such a way that a membrane of the ultrasonic distance sensor is located in a plane with an outer side of the second end section facing the material/liquid. This enables an exact determination of the distance between the outer side of the sensor and the material.

According to one embodiment, the second end section has a diameter D. The diameter D is smaller than a diameter of the first end section. The diameter D of the second end section preferably corresponds to 10 times the acoustic wavelength A of the ultrasonic burst.

According to an embodiment, the first end section has at least one opening, preferably several openings. The respective opening completely penetrates the first end section. The respective opening serves to receive at least one locking element, for example a countersunk screw. The at least one opening is formed on an outer side of the first end section facing away from the material/liquid.

According to an embodiment, the at least one locking element is formed for connection to a fastening element, for example a bolt. The fastening element is arranged in an inner region of the housing. The fastening element is adapted to support the electronic circuit. The fastening element is further adapted to fasten the electronic circuit to the first end section of the housing. This ensures an efficient and secure connection of the housing parts and the electronic circuit.

According to a further embodiment, a device is described. The device is adapted for measuring a filling level in a container. Preferably, the device is used to determine the filling level of a liquid or bulk material in a standard container.

The device has a lid. The lid is a standard lid, for example a DN-150 lid. The lid is adapted to be detachably connected to the container. The lid is adapted to be connected to the container in such a way that no gas or liquid can escape from the container. The lid has at least one opening. However, the lid may also have two or more openings. Preferably, the opening comprises a screw thread.

The device further comprises at least one sensor system. The sensor system corresponds to the sensor system described above. The sensor system is inserted into the opening of the lid. The sensor system is detachably connected to the lid. The sensor system is preferably screwed to the lid, preferably in the form of a grub screw. The sensor system and lid are connected to each other in such a way that no gas or liquid can escape from the container. Preferably, a sealing element is arranged between the sensor system and the lid.

With the device described above, the filling level of the container can be precisely determined in a simple manner using a standard infrastructure (container, lid). The filling level is determined non-invasively and without contact. Thus a device with highest user comfort is provided.

According to a further embodiment, a use of a sensor system for measuring the filling level of a material (preferably a liquid and/or a bulk material) in a container is described. The sensor system corresponds to the sensor system described above. The container is a standard or norm container. The container has a standard or norm lid. The sensor system is adapted for a detachable, gas- and liquid-tight connection with the container. Preferably, the sensor system is screwed to the lid of the container.

The sensor system can be easily applied to the container, in particular screwed into the lid, and removed again. The sensor system is lightweight, portable and not bound to any infrastructure (external cable connections). It enables simple, precise and non-invasive measurement of the filling level.

According to a further embodiment, a method for measuring a filling level of a material, preferably the filling level of a liquid or bulk material, in a container is described. All features disclosed with respect to the sensor system, the device, the use or the method are also disclosed correspondingly with respect to the respective other embodiment and vice versa, even if the respective feature is not explicitly mentioned in the context of the respective embodiment. The method comprises the following steps:

A) Providing a container with a lid, wherein the lid is screwed to the container and wherein the lid has an opening with a screw thread (internal thread). The container and lid are commercially available standard components.

B) Providing a sensor system as described above. The sensor system has a thread (external thread), preferably a G2 thread.

C) Screwing the sensor system to the lid via the screw thread and the thread. This provides a detachable, gas- and liquid-tight connection between the sensor system and the lid.

D) Emitting an ultrasonic burst by the ultrasonic sensor and receiving the echo generated at the surface of the material by the ultrasonic sensor.

E) Evaluation of the distance between the sensor system and the surface of the material from the propagation time of the echo.

F) Determination of the filling level of the material by the electronic circuit.

A multiple repetition of step D) and E) can be performed. Subsequently, a plausibility evaluation of the distance measurement can be performed by the electronic circuit.

The procedure describes a measurement method without any contact with the material. Modifications to the container are not necessary. Likewise, the filling level measurement is independent of the content and material of the container. The method is particularly well suited for hazardous liquids or bulk materials.

BRIEF DESCRIPTION OF THE DRAWINGS

The drawings described below are not to be taken as true to scale. Rather, individual dimensions may be enlarged, reduced or even distorted for better representation.

Elements which resemble each other or which assume the same function are designated with the same reference signs.

DETAILED DESCRIPTION OF ILLUSTRATIVE EMBODIMENTS

Figure 1:
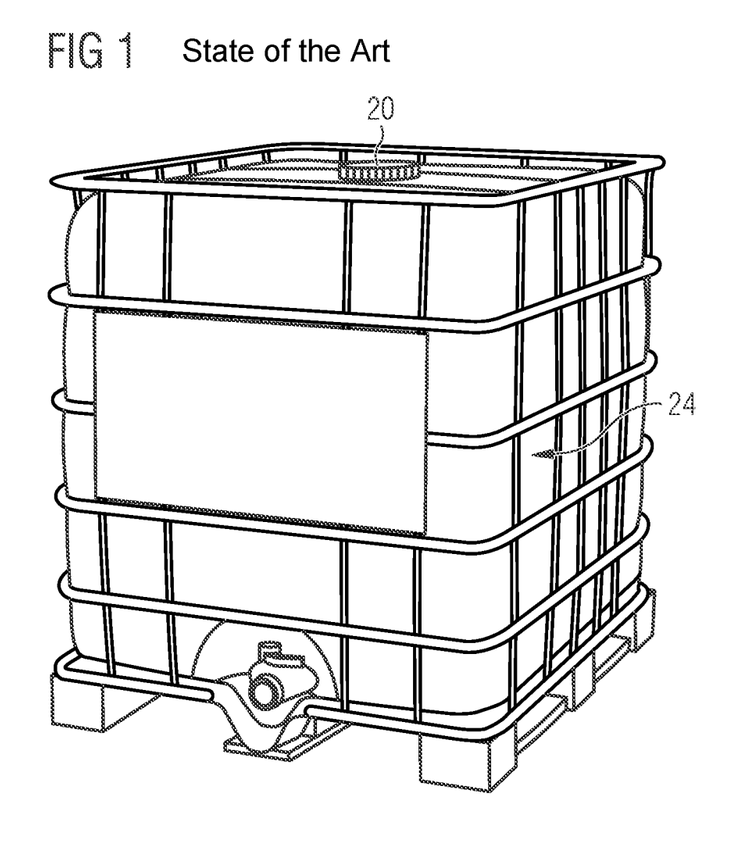
FIG. 1 shows a container for holding a liquid according to the state of the art.

FIG. 1 shows a container 24 for holding a liquid according to the state of the art. The container 24 is a canister. The container 24 may have different sizes for holding different volumes of liquid. The container shown in FIG. 1 is intended to hold the liquid "AdBlue". Of course, the sensor system 1 and the device 30 described below can also be used to measure the filling level of other liquids or other materials (e.g. bulk material).

The container 24 has an opening at an upper side of the container 24. This opening is used, for example, to fill liquid into the container 24. The container 24 further comprises a closure or lid 20. The lid 20 is arranged on the upper side of the container 24. The lid 20 serves to close or seal the opening of the container 24. In particular, the lid 20 is installed in the container 24 in a sealed manner, for example by means of a silicone ring. Lid 20 and container 24 are connected to each other in a gas-tight manner.

The lid 20 is a standard canister lid. For example, the lid 20 is a DN-150 lid, i.e. has an approximate inner diameter of 150 mm. Of course, other standard lids are also conceivable, for example with DN-80, DN-100, DN-125 or DN-175. In particular, standard lids 20 of a wide variety of sizes can be used, depending on the configuration of the container 24.

The lid 20 is detachably connected to the container 24. Preferably, the lid 20 has a screw thread 23 (see for example FIG. 5). The screw thread 23 is an internal thread. Preferably, the lid 20 is detachably connected to the container 24 via the screw thread 23.

Figure 2:
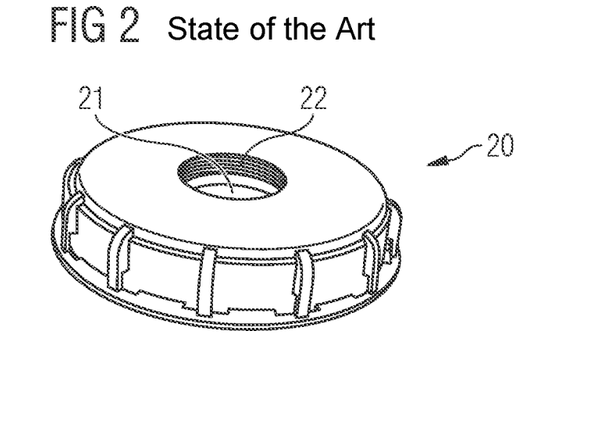
FIG. 2 shows a lid according to the state of the art for the container of FIG. 1.

A detailed view of the lid 20 is shown in FIG. 2.

The lid 20 has at least one opening 21, in this embodiment exactly one opening 21. The opening 21 is continuous. Of course, the lid 20 can also have more than one opening 21, for example two openings 21.

In this embodiment, the opening 21 is formed centrally on an upper side of the lid 20 and completely penetrates the lid 20. However, the opening 21 can of course also be formed offset from the center of the upper side (not explicitly shown).

The opening 21 serves by default for the insertion of an element for pressure compensation, for example a ventilation valve (not explicitly shown). The opening 21 further serves for the insertion of the sensor system 1 for filling level measurement, as described in detail in connection with FIGS. 3 to 6.

In the case where there is only one opening 21, the element for pressure compensation is first removed from the opening 21 and then the sensor system 1 is inserted into the opening 21. After the filling level measurement has been completed, the sensor system 1 is removed again and the element for pressure compensation is reinserted into the opening 21.

In case that the lid 20 has two openings 21, one of the openings 21 is used to insert the element for pressure compensation and the other of the openings 21 is used to insert the sensor system 1. In this case, the element for pressure compensation and also the sensor system 1 can also be permanently inserted in the respective opening 21.

Figure 3:
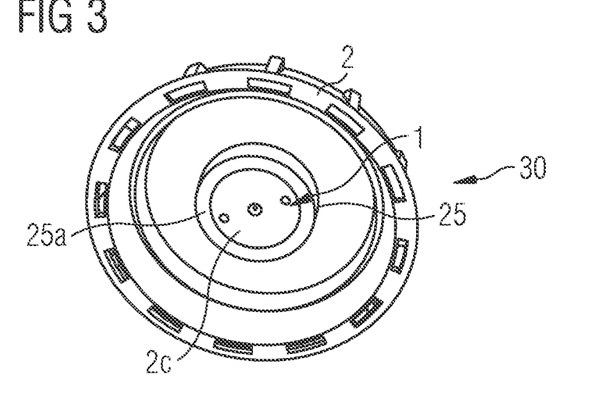
FIG. 3 shows a bottom view of a device for measuring a filling level.
Figure 4:
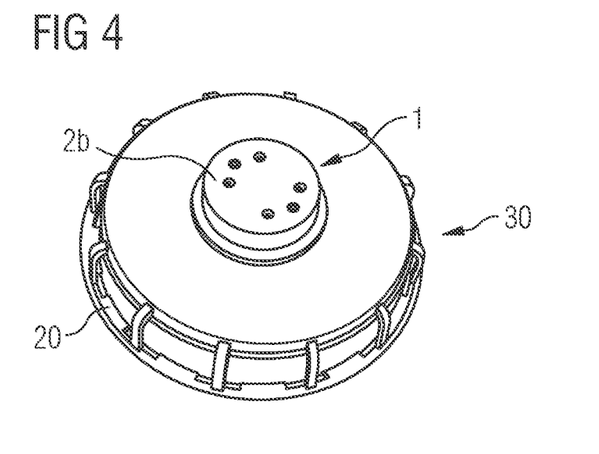
FIG. 4 shows a top view of the device for measuring a filling level according to FIG. 3.
Figure 5:
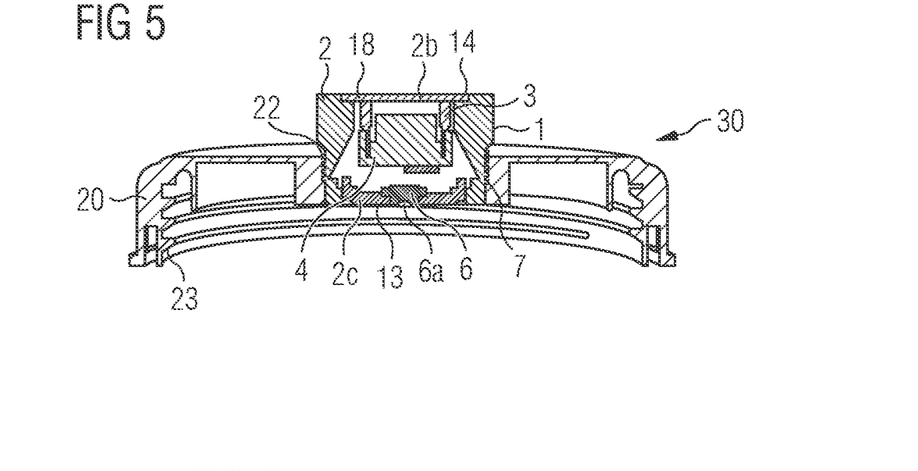
FIG. 5 shows a sectional view of the device according to FIG. 3.

FIGS. 3 to 5 show a device 30 for measuring a filling level of a material, for example a liquid, in a container 24. The container 24 can be, for example, the container shown in FIG. 1, but also any other common liquid container.

The device 30 comprises the lid 20 described in connection with FIG. 2. The lid 20 may be any common lid for a standard canister.

The device 30 further comprises a sensor system 1. The sensor system 1 is adapted in the manner of a grub screw so that it fits into openings provided for standard lids for standard canisters. The sensor system 1 is inserted into the opening 21 of the lid 20. The sensor system 1 is detachably connected to the lid 20. Preferably, the sensor system 1 is connected to the lid 20 via a screw connection.

A screw thread 22 is formed in the inner region of the opening 21. Further, a thread 7 is formed on an outer area of the sensor system 1 (see FIG. 5). The thread 7 is preferably a G2 thread. The threads 7, 22 engage with each other to establish a detachable connection between the lid 20 and the sensor system 1.

A sealing element, for example an O-ring, is arranged between the sensor system 1 and the lid 20 (not explicitly shown), as will be explained in detail later. The sealing element preferably comprises silicone. The sealing element ensures a secure fastening of the sensor system 1 to the lid 20. Furthermore, the sealing element ensures a gas-tight connection between the sensor system 1 and the lid 20.

The sensor system 1 protrudes beyond an upper side of the lid 20, as can be seen in FIGS. 4 and 5. In this way, the sensor system 1 is easily accessible to a user 1, for example for unscrewing the sensor system 1 from the opening 21.

The sensor system 1 is inserted into the opening 21 in such a way that an underside of the sensor system 1 is flush with an end face 25a of a circumferential wall element 25 (see FIG. 3). The wall element 25 limits the opening 21 in the radial direction and represents an annular projection which projects from an underside of the lid 20 into the container 24, i.e. in the direction of the liquid.

The sensor system 1 is adapted to measure the filling level of a material, for example a liquid. In particular, the sensor system 1 serves to determine the filling level of the liquid stored in the container 24.

Figure 6:
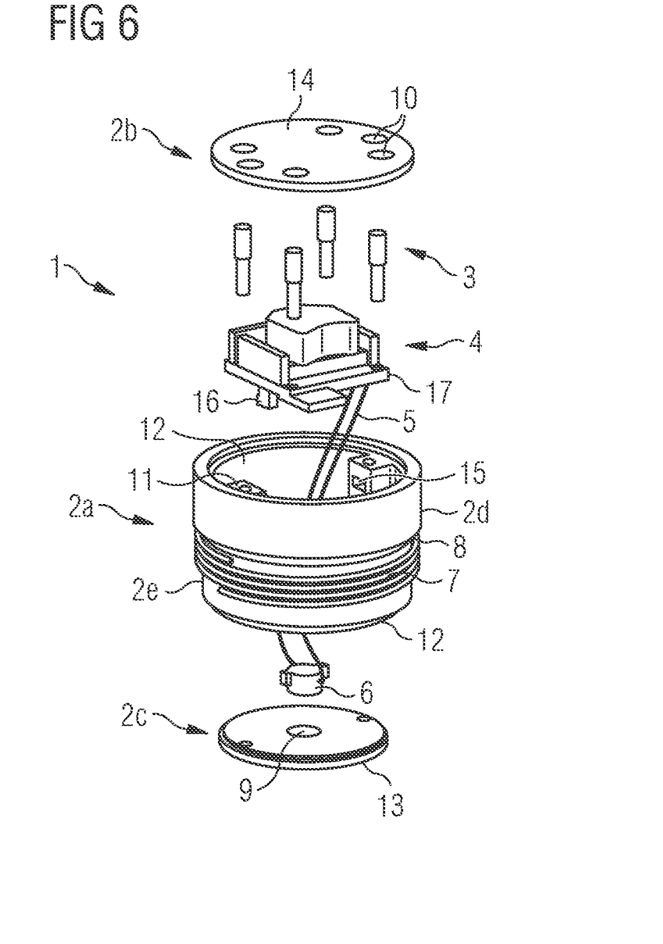
FIG. 6 shows a sensor system for measuring a filling level.

In the following, the design and operation of the sensor system 1 will be explained in detail in connection with FIGS. 5 and 6.

The sensor system 1 comprises a housing 2. The sensor system 1 further comprises an electronic circuit 4 and an ultrasonic distance sensor 6. The ultrasonic distance sensor 6 is adapted to measure a track/distance between the sensor system 1 and a liquid level in the container 24 by means of the echo propagation time of an ultrasonic burst in the air. If the shape and size of the container 24 are known, the filling level of the liquid or the remaining volume of the liquid can be derived from this with the aid of the electronic circuit 4 and displayed to a user via an interface (e.g. wireless interface with application on the cell phone, or also a display directly on the sensor system 1), as will be explained in more detail below.

The sensor system 1 further comprises at least one fastening element 3, preferably several fastening elements 3.

The fastening element 3 is adapted to receive or support the electronic circuit 4. For this purpose, the fastening element 3, for example a bolt, is introduced into a receiving element 17, for example an opening, on the electronic circuit 4.

Furthermore, the sensor system 1 has at least one connecting element 5 for electrically connecting the electronic circuit 4 to the ultrasonic distance sensor 6. The connecting element 5 may comprise one or more cables. Electronic circuit 4, ultrasonic distance sensor 6 and fastening element 3 are arranged in an inner area of the housing 2 (FIG. 5).

The housing 2 is made of several pieces. The housing 2 has a middle section 2a. The middle section 2a is in the form of a cylinder shell. The middle section 2a is sleeve-shaped. The middle section 2a has a continuous opening 12 for receiving the above-mentioned components of the sensor system 1.

The middle section 2a is formed in one piece. The middle section 2a has a first portion or section 2d and a second portion or section 2e. The first section 2d is further away from the liquid than the second section 2e in the installed state of the sensor system 1. The first section 2d has a larger outer diameter than the second section 2e.

The second section has a threaded, the thread 7 described above, on its outer surface. The thread 7 is provided for mechanical interaction with the internal thread or screw thread 22 of the opening 21. Preferably, the thread is a G2 thread.

The first section 2d has a smooth outer surface. A stop 8 is formed at a transition region between the first section 2d and the second section 2e. The stop 8 is formed directly above the thread 7. In the installed state, the sealing element described above is attached to the stop 8 (not explicitly shown). In this way, the installation height of the sensor system 1 in the opening 21 is determined with sufficient accuracy.

The middle section 2a further comprises a connecting element 15. The connecting element 15 is arranged in the inner area and has a recess or opening. The connecting element 15 is configured to engage a connecting element 16 on the electronic circuit 4, for example a protrusion or tongue. Preferably, the connecting elements 15, 16 snap into each other. Due to the mechanical interaction of the connecting elements 15, 16 the electronic circuit 4 is secured to the middle section 2a.

The housing 2 further comprises a first end section 2b and a second end section 2c. The respective end section 2b, 2c is formed as a flat disk or cylindrical disk. The respective end section 2b, 2c serves to close off the middle section 2a of the housing 2 towards the top and bottom and to protect the components of the sensor system 1 placed in the housing 2 from external influences.

The first end section 2b forms—in the installed state—an outer side or outer surface 14 of the sensor system 1 facing away from the liquid. The first end section 2b has at least one, preferably a plurality, of openings 10. The openings 10 are formed continuously. In other words, the respective opening 10 completely penetrates the first end section 2b. The respective opening serves to receive a locking element 18 (see FIG. 5), for example a countersunk screw.

The locking element 18 is used to fasten the at least one fastening element 3, for example a bolt, to the first end section 2b. Furthermore, with the aid of the locking element 18 and the fastening element 3, the first end section 2b can be fastened, preferably detachably fastened, to the middle section 2a. At least one receiving element 11, preferably several receiving elements 11, is provided for this purpose on the middle section 2a, in particular in an inner region of the middle section 2a. The receiving element 11 has a recess or opening and serves to receive the fastening element 3 and/or further fastening elements (not explicitly shown).

At the first end section 2b, in particular at the outer surface 14, a switch can be provided which can switch the supply voltage for the electronic circuit 4 on and off (not explicitly shown). Furthermore, display elements may be provided, e.g. an LED to indicate the switched-on state, for battery voltage control, or a display, e.g. an e-paper, to indicate the filling level, or the like. This serves to increase the user-friendliness of the sensor system 1.

The second end section 2c forms—in the installed state—an outer side or outer surface 13 of the sensor system 1 facing the liquid. The second end section 2c is preferably screwed to the middle section 2a of the housing 2. A connection by means of bolts is also conceivable.

The second end section 2c has a diameter D. The diameter D of the second end section 2c is smaller than a diameter of the first end section 2b. The second end section 2c has an opening 9. The opening 9 is formed continuously. In other words, the opening 9 completely penetrates the second end section 2c. The opening 9 is formed centrally on the second end section 2c.

The opening 9 serves to at least partially receive the ultrasonic distance sensor 6. In particular, the ultrasonic distance sensor 6 is inserted into the second end section 2c such that a membrane 6a of the ultrasonic distance sensor 6 is located in a plane with the outer surface 13 of the second end section 2c (FIG. 5).

The ultrasonic distance sensor 6 is adapted to emit at least one, preferably a plurality, of ultrasonic bursts. Preferably, the ultrasonic distance sensor 6 emits bursts of an operating frequency of, for example, 75 kHz. The operating frequency of the bursts may be varied. For example, the operating frequency is between 20 kHz and 100 KHz.

Preferably, the diameter D of the second end section 2c is 10 times the acoustic wavelength A of the ultrasonic burst emitted by the ultrasonic distance sensor 6. Preferably, the diameter D of the second end section 2c is between 3 and 6 cm. For example, the diameter D=4.5 cm, 4.6 cm or 5 cm.

The ultrasonic distance sensor 6 is further adapted to receive the echo generated by the ultrasonic burst on the liquid surface. The distance between the sensor system 1, in particular the membrane 6a of the ultrasonic distance sensor 6 (see FIG. 5) and a surface of the liquid (liquid level) can be determined from this propagation time at a known sound velocity in air, possibly taking into account the propagation time change with temperature.

A principled minimum measuring distance (maximum filling level) for the ultrasonic distance sensor 6 should be as small as possible, e.g. 12 cm or less. The directional characteristic (the aperture angle) should be adapted in such a way that reflections are only received from the liquid level, not from other parts of the container 24.

The distance between the outer surface 13 of the sensor system 1 and the surface of the liquid determined by the ultrasonic distance sensor 6 can then be used by the electronic circuit 4 to determine a filling level of the liquid.

The electronic circuit 4 preferably has a micro-controller for controlling the measuring process and for evaluating the filling level. The electronic circuit 4 further comprises a battery or supply unit or an energy harvester for energy supply. The electronic circuit 4 can, for example, design the measurement sequence to conserve the battery in such a way that the sensor system 1 is activated, for example, once per hour and in the meantime goes into an operating state with minimum energy consumption.

Furthermore, the electronic circuit 4 can provide house-keeping functions (for example, monitoring of the supply voltage, temperature, etc.) to better ensure the plausibility of measurements.

Preferably, the electronic circuit 4 further comprises an interface for outputting the measurement data, preferably a BLE module. Furthermore, the electronic circuit 4 can have a temperature sensor and an operating voltage monitor.

The electronic circuit 4 can also be used to derive actions from previously defined liquid filling level values, for example an alarm, an SMS or an email requesting reordering of the corresponding liquid. This can also be directly processed in an automated system.

The sensor system 1 can either be protected from the liquid in the container 24 by its design (for example, via a closed surface of the housing 2), or other suitable protective measures can be taken, for example, against splashing water (for example, a protective membrane between the sensor system 1 and the liquid, for example Gore-Tech, etc.).

In the following, a method for measuring a filling level in a container, preferably the container 24 described above, at least partially filled with a material, preferably a liquid, is described. The method comprises the following steps:

A) Providing the container 24. The container 24 is a standard container, preferably a standard canister. The container 24 is at least partially filled with a liquid. The container 24 has the lid 20 described above. The lid 20 is a standard lid, for example a DN-150 lid. The lid 20 is screwed to the container 24. Lid 20 and container 24 are connected to each other in a gas-tight manner. The lid 20 has the at least one opening 21 described above.

B) Providing the sensor system 1 described above. The sensor system 1 is adapted to measure the filling level of the liquid in the container 24. The sensor system 1 has the components and functions described above.

C) Inserting the sensor system 1 into the opening 21 of the lid 20. In particular, the sensor system 1 is screwed to the lid 20 via the screw thread 22 and the thread 7. The sealing element described above is introduced into the connection between the threads 22, 7 at the position of the stop 8. This ensures that the sensor system 1 and the lid 20 are connected to each other in a gas-tight manner. Furthermore, no liquid can escape from the opening 21. The sealing element also ensures optimum alignment (installation height) of the sensor system 1 in relation to the lid 20.

D) Emitting an ultrasonic burst by the ultrasonic sensor 6 and receiving the echo generated at the liquid surface by the ultrasonic sensor 6. Preferably, the ultrasonic burst has an operating frequency F of 75 kHz.

E) Evaluation of the distance/track between the sensor system 1, in particular the outer surface 13 of the sensor system 1 facing the liquid, and the liquid level from the propagation time of the echo.

Preferably, step D) and E) are repeated several times. For example, three distance measurements are made. Subsequently, a plausibility evaluation of the distance measurement can be performed by the electronic circuit 4. The distance measurement result can be stored in a memory with a time stamp.

F) Determination of the filling level of the liquid by the electronic circuit 4 from the measured distance, taking into account geometric parameters of the container 24 (shape and size of the container 24).

The determined result can be displayed to the user via an interface (e.g. wireless interface with application on the cell phone, for example BLE, if a phone with the appropriate application is nearby, or else a display directly on the outer surface 14 of the sensor system 1). Current data, derived events, or co-logged data about the time course of liquid consumption can thus be transmitted away from the sensor system 1 and made available to the user.

The result can further be compared by the electronic circuit 4 with defined conditions for triggering events (e.g. sending SMS for reordering when the filling level falls below a certain level).

The description of the objects disclosed herein is not limited to the individual specific embodiments. Rather, the features of the individual embodiments can be combined with each other in any way—as far as this makes technical sense.

The invention claimed is:

1. A sensor system comprising:
a housing having a middle section, a first end section and a second end section, wherein the middle section has a shape of a cylinder shell, wherein the first end section and the second end section are arranged at opposite openings of the middle section, wherein the first and second end sections are each disc-shaped, and wherein the first end section has at least one opening for receiving at least one locking element;
an electronic circuit; and
an ultrasonic distance sensor,
wherein the electronic circuit and the ultrasonic distance sensor are arranged in the housing,
wherein the sensor system is configured to measure a distance between the sensor system and a surface of a material in a container by an echo propagation time of an ultrasonic burst in air,
wherein the at least one opening is arranged on an outer side of the first end section facing away from the material,
wherein the at least one locking element is configured to connect to a fastening element,
wherein the fastening element is arranged in an inner region of the housing, and
wherein the fastening element is adapted to support the electronic circuit and to fasten the electronic circuit to the first end section.

2. The sensor system according to claim 1,
wherein the ultrasonic distance sensor is configured to emit at least one ultrasonic burst,
wherein a frequency of the ultrasonic burst lies in a range B of 20 kHz$<$B$\leq$100 kHz, and
wherein the ultrasonic distance sensor is configured to receive an echo generated by the ultrasonic burst at the surface of the material.

3. The sensor system according to claim 1, wherein the electronic circuit is configured to determine a filling level of the material from the measured distance, taking into account geometric parameters of the container.

4. The sensor system according to claim 1, wherein the sensor system is configured to be arranged in a lid of the container.

5. The sensor system according to claim 4, wherein a thread is located on an outer side of the housing, and wherein the thread is configured to mechanically connect the housing to the lid of the container.

6. The sensor system according to claim 1,
wherein the second end section has an opening, and
wherein the ultrasonic distance sensor is located in the opening in such a way that a membrane of the ultrasonic distance sensor is located in a plane with an outer side of the second end section facing the material.

7. The sensor system according to claim 1, wherein the second end section has a diameter which corresponds to 10 times an acoustic wavelength of the ultrasonic burst.

8. The sensor system according to claim 1, wherein the electronic circuit is configured to monitor a temperature or a supply voltage.

9. The sensor system according to claim 1, wherein the electronic circuit is configured to trigger an action at a predefined filling level value.

10. The sensor system according to claim 1, wherein the housing has a closed surface or a protective membrane.

11. The sensor system according to claim 1, wherein the sensor system is detachable and portable.

12. The sensor system according to claim 1, wherein the electronic circuit comprises a supply unit or an energy harvester as a power supply.

13. The sensor system according to claim 1, wherein the sensor system is configured to output a determined result to a user via a wireless interface or via a display.

14. The sensor system according to claim 13, wherein the display is located directly on an outer side of the sensor system.

15. A device comprising:
at least one sensor system according to claim 1; and
a lid configured to be detachably connected to the container,
wherein the lid has at least one opening,
wherein the sensor system is located in the opening of the lid, and
wherein the sensor system is detachably connected to the lid.

16. The device according to claim 15, wherein the opening has a screw thread, and wherein the sensor system is screwed to the lid via the thread of the housing.

17. The device according to claim 15, further comprising a sealing element arranged between the sensor system and the lid.

18. A method for measuring a filling level of the material in the container, the method comprising:
providing the container with a lid, wherein the lid is screwed to the container, and wherein the lid has an opening with a screw thread;
providing the sensor system according to claim 1;
screwing the sensor system to the lid via the screw thread and the thread;
emitting the ultrasonic burst by the ultrasonic distance sensor and receiving an echo generated at the surface of the material by the ultrasonic distance sensor;
evaluating the distance between the sensor system and the surface of the material from the propagation time of the echo; and
determination of the filling level of the material by the electronic circuit.

19. The method according to claim 18, wherein emitting the ultrasonic burst and evaluating the distance is multiple times repeated, and wherein subsequently a plausibility evaluation of a distance measurement is carried out by the electronic circuit.

20. The method according to claim 18, further comprising outputting a determined result via an interface.

21. The method according to claim 18, further comprising comparing a determined result with predetermined conditions thereby triggering an event.

22. A method for using the sensor system according to claim 1, the method comprising:
detachably connecting the sensor system with the container in a gas- and liquid-tight manner.

23. The sensor system according to claim 1, wherein the first end section is fastened to the middle section via the locking element and the fastening element.

* * * * *